US006865932B2

(12) United States Patent
Luce

(10) Patent No.: US 6,865,932 B2
(45) Date of Patent: Mar. 15, 2005

(54) DEVICE FOR MOUNTING A SENSOR ON A MOTOR VEHICLE WHEEL RIM AND RELATED MOUNTING METHOD

(75) Inventor: Dominique Luce, Toulouse (FR)

(73) Assignee: Siemens VDO Automotive, Toulouse Cedex (FR)

( * ) Notice: Subject to any disclaimer, the term of this patent is extended or adjusted under 35 U.S.C. 154(b) by 0 days.

(21) Appl. No.: 10/473,864

(22) PCT Filed: Aug. 5, 2002

(86) PCT No.: PCT/EP02/08693

§ 371 (c)(1),
(2), (4) Date: Oct. 3, 2003

(87) PCT Pub. No.: WO03/022603

PCT Pub. Date: Mar. 20, 2003

(65) Prior Publication Data

US 2004/0103965 A1 Jun. 3, 2004

(30) Foreign Application Priority Data

Sep. 6, 2001 (FR) .......................................... 01 11539

(51) Int. Cl.⁷ .............................................. B60C 23/00
(52) U.S. Cl. ....................... 73/146.8; 340/442; 340/445
(58) Field of Search ............................ 73/146.5, 146.8; 345/442, 445, 443

(56) References Cited

U.S. PATENT DOCUMENTS

| 4,763,517 A | * | 8/1988 | Feinberg ..................... 73/146.8 |
|---|---|---|---|
| 4,883,105 A | | 11/1989 | Schultz ........................ 152/416 |
| 4,883,106 A | | 11/1989 | Schultz et al. ............... 152/417 |
| 4,893,664 A | | 1/1990 | Oltean ......................... 152/416 |
| 4,917,163 A | | 4/1990 | Schultz ........................ 152/415 |
| 4,922,946 A | | 5/1990 | Boulicault ................... 137/102 |
| 4,924,926 A | | 5/1990 | Schultz et al. ............... 152/417 |
| 5,083,457 A | * | 1/1992 | Schultz ....................... 73/146.5 |
| 5,121,774 A | | 6/1992 | Hicks et al. ..................... 141/4 |
| 5,174,839 A | | 12/1992 | Schultz et al. ............... 152/415 |
| 5,179,981 A | | 1/1993 | Hicks et al. ..................... 141/4 |
| 5,180,456 A | | 1/1993 | Schultz et al. ............... 152/416 |
| 5,253,687 A | | 10/1993 | Beverly et al. .............. 152/416 |
| 5,837,891 A | * | 11/1998 | Bridge ........................ 73/146.8 |
| 5,844,131 A | | 12/1998 | Gabelmann et al. | |
| 6,055,855 A | | 5/2000 | Straub | |

FOREIGN PATENT DOCUMENTS

DE          200 15 295       4/2001

* cited by examiner

Primary Examiner—Edward Lefkowitz
Assistant Examiner—Andre Allen
(74) Attorney, Agent, or Firm—Young & Thompson

(57) ABSTRACT

A device for mounting a sensor on a motor vehicle wheel rim comprises: a truss rod, a housing receiving the sensor, the housing being articulated relative to the truss rod, a member for locking the truss rod in position on the rim once the housing is in contact with the rim. The housing includes a first stop element designed to co-operate by contact with a first zone of the rim, the first stop element being arranged on one side of a plane P passing through the hinge pin of the housing and a second stop element arranged on the other side of the plane and designed to press on the rim under a force F exerted by the truss rod. The invention also concerns the mounting method associated with the device.

9 Claims, 4 Drawing Sheets

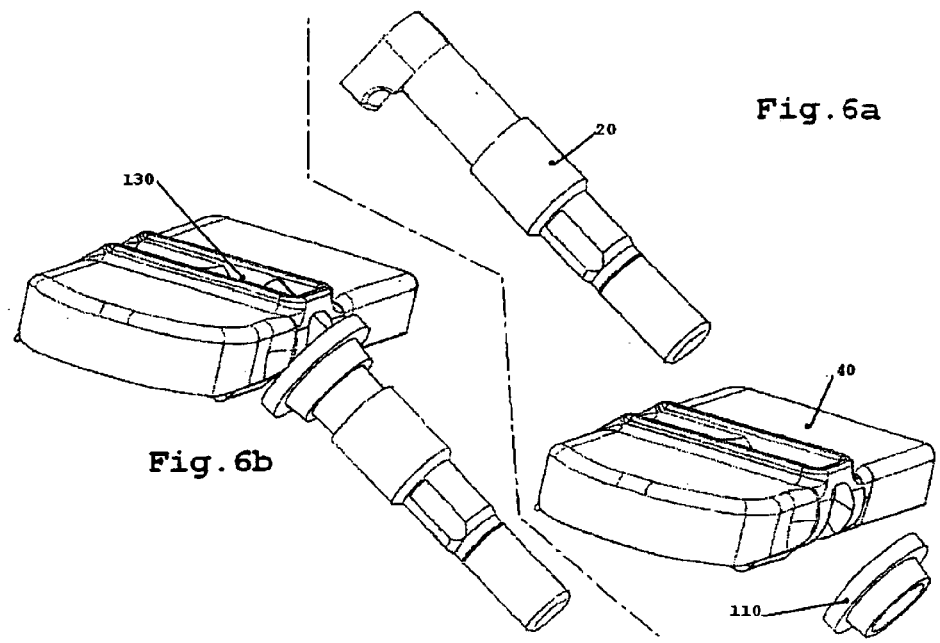
Fig. 6a
Fig. 6b
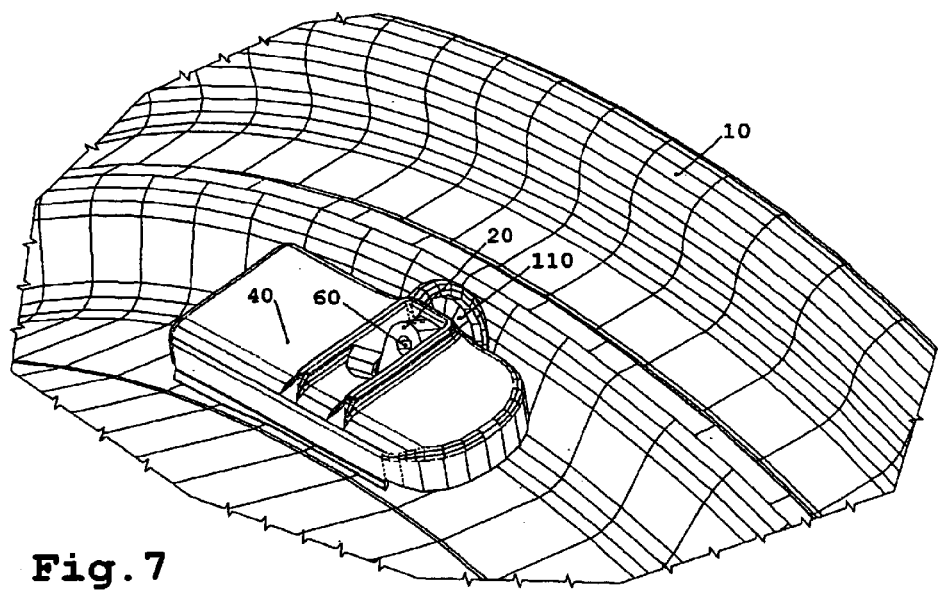
Fig. 7

DEVICE FOR MOUNTING A SENSOR ON A MOTOR VEHICLE WHEEL RIM AND RELATED MOUNTING METHOD

CROSS REFERENCE TO RELATED APPLICATIONS

This is the 35 USC 371 national stage of international application PCT/EP02/08693 filed on 05 Aug. 2002, which designated the USA.

FIELD OF THE INVENTION

The present invention relates to a device for mounting a casing on a motor vehicle wheel rim and more specifically to a device for mounting a tire pressure sensor and to the associated mounting method.

BACKGROUND OF THE INVENTION

It is known practice for a tire pressure sensor to be incorporated into the rim of the wheel of a motor vehicle. The sensor is generally incorporated into a casing itself fixed to the valve. Patent U.S. Pat. No. 6,055,855 suggests, for example, forming a housing in the sensor casing, introducing into this housing a nut, and screwing into this nut a valve that has a suitable screw thread. The assembly is then secured to the rim via a second nut. The rim/sensor/valve/nuts assembly can be positioned manually as long as said nuts are not locked, because of a degree of freedom offered to the casing. This gives a certain leeway for fitting the sensor to different types of rim. This prior art does, however, have the major disadvantage of requiring a special valve that has undergone numerous machining operations, and of being made up of numerous parts. It is also very difficult to adjust the position of the sensor quickly because of the two nuts that have to be operated together. Furthermore, there is nothing to guarantee that the sensor will actually be in contact with the rim, and this carries the risk of causing premature sensor wear and possible destruction of this sensor because of the vibrations that the absence of contact would not fail to produce.

The problem that the present invention sets out to solve is therefore one of proposing a mounting method that is quick, economical, easy to perform and reliable, allowing a casing to be pressed systematically against varied rim profiles without the risk of the sensor being destroyed through poor contact or an excessive overhang between the casing and the rim.

SUMMARY OF THE INVENTION

To this end, the present invention relates to a device for mounting a sensor on a motor vehicle wheel rim, comprising:

a pulling piece, a casing accommodating the sensor, said casing being articulated with respect to the pulling piece, a means for locking the pulling piece in position on the rim once the casing is in contact with the rim, this device being notable in that said casing comprises a first stop designed to collaborate through contact with a first region of the rim, said first stop being placed on one side of a plane P passing through the axis of articulation of the casing and a second stop placed on the other side of said plane and designed to press against the rim under a force F exerted by the pulling piece.

Advantageously, the length of the lever arm between the first stop and the axis of articulation of the casing is short by comparison with the distance between the second stop and said axis, which means that a large variation in the angular position of the casing can be generated for a small translational movement of the pulling piece.

Advantageously, also, the pulling piece consists of the tire inflation valve body, the base of which is designed to collaborate with the casing, and the body of which is equipped with a nut that locks the valve on the rim.

The present invention also relates to a method of mounting a sensor on a motor vehicle wheel rim, characterized in that it consists in bringing a casing containing the sensor against the rim under the effect of the tilting moment generated jointly by the pulling force F exerted on the pulling piece and by the reaction exerted at a first stop incorporated into said casing and placed on one side of the plane passing through the axis of articulation of the casing and perpendicular to its upper surface when said stop comes into contact with the rim, said tilting being halted by a second stop incorporated into the casing and coming into contact with the rim, which other stop is placed on the other side of said plane.

BRIEF DESCRIPTION OF THE DRAWING

Other characteristics and advantages of the invention will become apparent from reading the description which will follow and from examining the attached drawings, in which:

FIGS. 6a and 6b depict perspective views of a casing, of its pulling piece and of the seal, one separately and the other once assembled, before they are mounted on the rim, FIG. 7 is a perspective view of a casing mounted on a rim by means of the device that is the subject of the present invention.

DETAILED DESCRIPTION OF THE INVENTION

Figure 1:
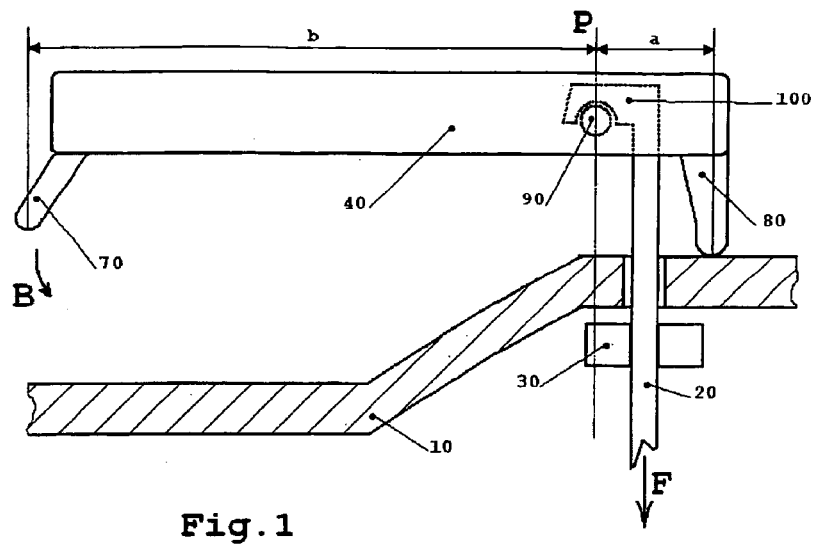
FIG. 1 is a schematic view of an articulated casing according to the invention.

The device that is the subject of the present invention consists of three main parts: a pulling piece 20, a casing 40 accommodating the sensor and articulated with respect to the pulling piece 20, and a pulling piece locking means 30. FIG. 1 allows a better understanding of how the device works. The pulling piece 20 is introduced into an orifice in the rim 10, advantageously, but not necessarily, the valve hole, and a pulling force F is applied to this piece to pull the casing 40 closer to the rim 10. A first stop 80 incorporated into the casing 40 then comes into contact with a first region of the rim 10 and, under the effect of a tilting moment generated by the pulling force F exerted by the pulling piece 20 on the casing 40 and the reaction exerted by the rim 10 at the first stop 80, the casing 40 tilts (arrow B) and this brings the second stop 70 of the casing 40 into contact with the rim 10, thus guaranteeing intimate contact between said casing 40 and the rim 10. The locking means 30 is then activated and the pulling piece 20 thus locked holds the casing 40 in position.

It should be noted that the distance "a" (the lever arm with respect to the first stop) is deliberately chosen to be short by comparison with the distance "b" (the lever arm with respect to the second stop) so as to allow a great variation in the angular position of the casing 40 as it tilts, this being for a short travel of the pulling piece 20. As this travel is short, it does not give rise to any great translational movement of the pulling piece 20, which therefore does not protrude beyond the track of the rim 10 and therefore does not run the risk of being damaged as the vehicle moves along.

The mounting illustration refers to FIGS. 2, 4, 6a, 6b, and 7. In these figures, the function of the pulling piece 20 is performed by the valve. The casing 40 is equipped with a housing 130 in which the valve is placed. The seal 110 is then slipped on and the assembly thus produced is placed inside the rim 10, the valve adopting its customary position. The valve nut 30 is then screwed onto the body of the valve from outside the rim 10, so as to clamp said rim 10 between the valve nut 30 on the one hand, and the casing 40 and seal 110 on the other. As soon as the casing 40, under the effect of the tightening of the valve nut 30 which induces a pulling force F into the valve, comes into contact with the rim 10 at the first stop 80, it automatically begins a tilting movement which will, as the valve nut 30 continues to be screwed on, bring it into contact with the rim 10 at its second stop 70. The casing 40 is then pressed firmly against the rim 10. The tightening of the valve nut 30 allows this firm pressing to be improved while guaranteeing sealing at the seal 110. It is evident that the screwing of the valve nut 30 is enough to guarantee that the casing 40 will be pressed on firmly in a simple and automatic way.

Figure 2:
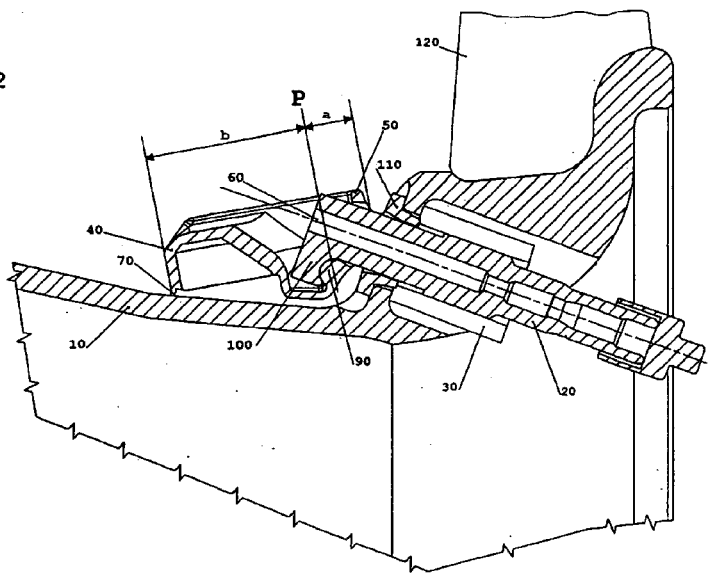
FIG. 2 is a view in section of a first embodiment of the mounting device according to the invention.
Figure 3:
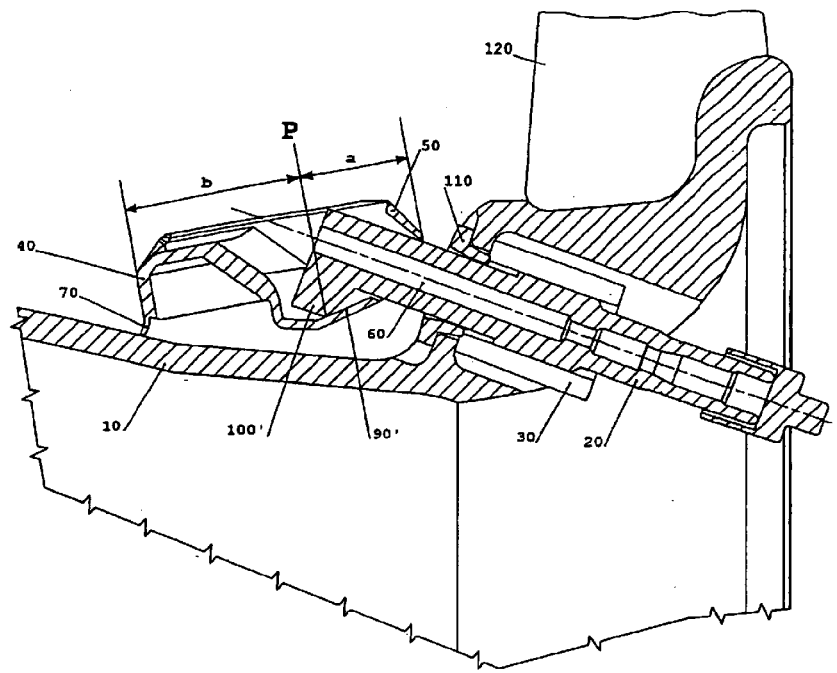
FIG. 3 is a view in section of a second embodiment of the mounting device according to the invention.
Figure 4:
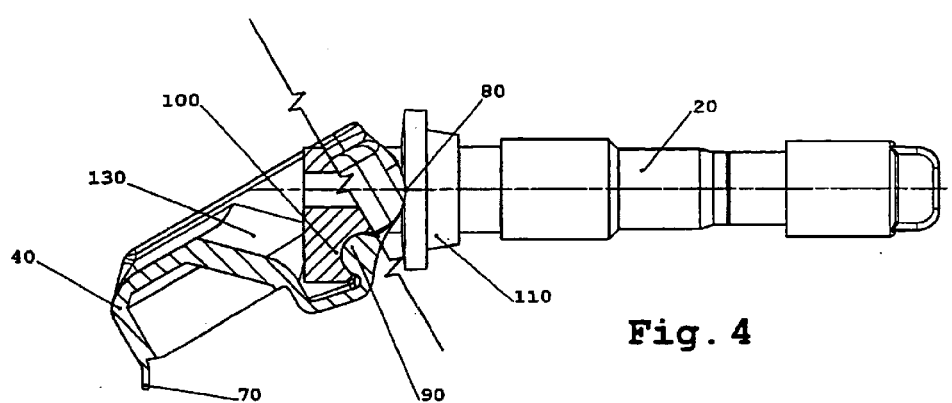
FIG. 4 is a side view in part section of a casing equipped with its pulling piece.

FIGS. 2 and 3 are two embodiments according to the invention, in which the pulling piece 20 consists of the inflation valve equipped with a suitable valve base 100, 100' and in which the valve locking means is a nut 30. In FIG. 2, the valve base 100 is in the form of a hook collaborating with a spindle 90 incorporated into the casing 40, whereas in FIG. 3 the valve base is formed of a lug 100' and presses against an inclined plane 90', these two embodiments forcing the casing 40 to tilt toward the rim 10. One possible alternative form of embodiment of the present invention (and this is not depicted) consists in equipping the valve base with a spindle that rests in a housing built into the casing, or any other equivalent means of articulation between the casing 40, on the one hand, and the pulling piece 20, on the other.

It must be noted that the casing 40 is designed to guide the tilting and allow it to occur in just one direction, the direction that will, in the cases illustrated, allow the casing 40 to be pressed into the part of the rim 10 furthest from the tire 120, so as to protect the sensor from the knocks and handling operations associated with changing the tires. This is made possible through the actual shape of the collaborating surfaces of the casing 40 and of the valve, and also through a stop 50 built into said casing and which allows just one direction of rotation, blocking the casing as required.

Figure 5A:
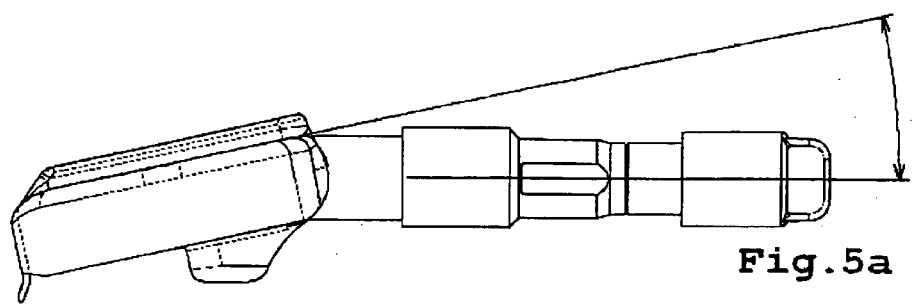
FIGS. 5a and 5b depict two possible positions (one with a small angle of tilt and one with a large angle of tilt) of the casing with respect to its pulling piece.
Figure 5B:
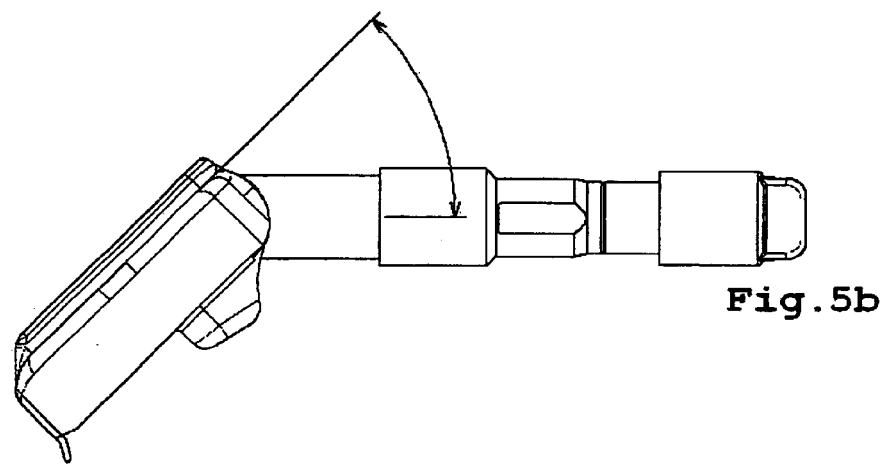

FIGS. 5a and 5b show the range of tilting that a device according to the invention can achieve, thus allowing the same assembly to be fitted to various profiles of rim 10, without any modification, and simply by tightening the valve nut 30 in the case illustrated. As can be seen from FIGS. 2 and 3, these varied positions do not in any way detract from the correct operation of the valve used here as a pulling piece 20, the casing 40 not obstructing the air passage orifice 60.

Of course, the invention is not limited to the embodiments described and depicted, which have been given solely by way of example. Thus, the present invention applies to a mounting device for mounting any object other than a sensor or indeed elsewhere, other than on the inflation valve orifice, the mounting method being suited to any existing orifice in the rim 10.

What is claimed is:

1. A device for mounting a sensor on a motor vehicle wheel rim (10), comprising:
   a pulling piece (20),
   a casing (40) accommodating the sensor, said casing (40) being articulated with respect to the pulling piece (20),
   a means (30) for locking the pulling piece in position on the rim (10) once the casing (40) is in contact with the rim (10),
   wherein said casing (40) comprises a first stop (80) designed to collaborate through contact with a first region of the rim (10), said first stop (80) being placed on one side of a plane P passing through the axis of articulation of the casing (40) and a second stop (70) placed on the other side of said plane and designed to press against the rim (10) under a force F exerted by the pulling piece (20).

2. The device for mounting a sensor as claimed in claim 1, wherein the length of the lever arm between the first stop and the axis of articulation of the casing (4) is short by comparison with the length of the lever arm between the second stop and said axis, which means that a large variation in the angular position of the casing (40) can be generated for a small translational movement of the pulling piece (20).

3. The device for mounting a sensor as claimed in claim 1, wherein the casing (40) comprises means (50) designed to limit its tilting to just one direction.

4. The device for mounting a sensor as claimed in claim 1, wherein the pulling piece (20) comprises a hook (100) collaborating with a spindle (90) placed in the casing (40).

5. The device for mounting a sensor as claimed in claim 1, wherein the pulling piece (20) comprises a spindle collaborating with a corresponding housing placed in the casing (40).

6. The device for mounting a sensor as claimed in claim 1, wherein the pulling piece (20) comprises a lug (100') collaborating with a corresponding inclined plane (90') placed in the casing (40).

7. The device for mounting a sensor as claimed in claim 1, wherein the pulling piece (20) consists of the tire inflation valve body, the base of which is designed to collaborate with the casing (40).

8. The device for mounting a sensor as claimed in claim 7, wherein the means for locking the valve on the rim (10) is a nut (30).

9. A method for mounting a sensor on a motor vehicle wheel rim (10), comprising:
   a pulling piece (20),
   a casing (40) accommodating the sensor, said casing (40) being articulated with respect to the pulling piece (20),
   a means (30) for locking the pulling piece in position on the rim (10) once the casing (40) is in contact with the rim (10),
   the method comprising bringing the casing (40) against the rim (10) under the effect of the tilting moment generated jointly by a pulling force F exerted on the pulling piece (20) and by the reaction exerted at a first stop (80) incorporated into said casing (40) and placed on one side of a plane P passing through the axis of the pulling piece (20) when said stop comes into contact with the rim (10), said tilting being halted by a second stop (70) incorporated into the casing (40) and coming into contact with the rim (10), which other stop is placed on the other side of said plane.

* * * * *